US010907612B2

(12) United States Patent
Grunnet et al.

(10) Patent No.: US 10,907,612 B2
(45) Date of Patent: Feb. 2, 2021

(54) CONTROL OF A WIND TURBINE USING REAL-TIME GAIN CALCULATION

(71) Applicant: VESTAS WIND SYSTEMS A/S, Aarhus N (DK)

(72) Inventors: Jacob Deleuran Grunnet, Tranbjerg J (DK); Thomas Krüger, Aarhus C (DK); Ali Zaib, Aalborg (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 9 days.

(21) Appl. No.: 16/088,419

(22) PCT Filed: Mar. 30, 2017

(86) PCT No.: PCT/DK2017/050093
§ 371 (c)(1),
(2) Date: Sep. 25, 2018

(87) PCT Pub. No.: WO2017/167343
PCT Pub. Date: Oct. 5, 2017

(65) Prior Publication Data
US 2019/0113022 A1    Apr. 18, 2019

(30) Foreign Application Priority Data
Mar. 30, 2016    (DK) .................................. 2016 70175

(51) Int. Cl.
*F03D 9/00*    (2016.01)
*H02P 9/04*    (2006.01)
(Continued)

(52) U.S. Cl.
CPC ........... *F03D 7/045* (2013.01); *F03D 7/0224* (2013.01); *F03D 7/046* (2013.01);
(Continued)

(58) Field of Classification Search
CPC ........ F03D 7/0224; F03D 7/045; F03D 7/046; F03D 2260/821; F03D 2260/84; F05B 2260/821; F05B 2260/84; Y02E 10/72
See application file for complete search history.

(56) References Cited

U.S. PATENT DOCUMENTS 4,160,170 A    7/1979    Harner et al.
4,161,658 A    7/1979    Patrick
(Continued)

FOREIGN PATENT DOCUMENTS

WO    2017167343 A1    10/2017

OTHER PUBLICATIONS

PCT International Search Report for Application No. PCT/DK2017/050093 dated Jun. 16, 2017.
(Continued)

*Primary Examiner* — Tulsidas C Patel
*Assistant Examiner* — Thomas K Quigley
(74) *Attorney, Agent, or Firm* — Patterson + Sheridan, LLP (57) ABSTRACT

A wind turbine control system comprising at least one control module configured to output a control signal for a control mechanism of a wind turbine, and a gain calculator for calculating a gain parameter associated with the control module, wherein the gain parameter is calculated based on a computerized real-time blade model using a determined wind turbine operating point as an input. The blade model may be a blade element momentum model. In another aspect, the invention may be expressed as a method of controlling a control mechanism of a wind turbine.

18 Claims, 5 Drawing Sheets

(51) Int. Cl.
*F03D 7/04* (2006.01)
*F03D 7/02* (2006.01)

(52) U.S. Cl.
CPC ..... *F05B 2260/821* (2013.01); *F05B 2260/84* (2013.01); *F05B 2270/32* (2013.01); *Y02E 10/72* (2013.01)

(56) References Cited

U.S. PATENT DOCUMENTS

| | | | | |
|---|---|---|---|---|
| 7,342,323 | B2* | 3/2008 | Avagliano | F03D 9/25 290/55 |
| 8,217,524 | B2* | 7/2012 | Nakashima | F03D 7/0224 290/44 |
| 2007/0041837 | A1 | 2/2007 | Ide et al. | |
| 2009/0295159 | A1 | 12/2009 | Johnson et al. | |
| 2011/0229300 | A1 | 9/2011 | Kanev et al. | |
| 2011/0305568 | A1 | 12/2011 | Brath et al. | |
| 2014/0167416 | A1 | 6/2014 | Perley et al. | |
| 2015/0285222 | A1 | 10/2015 | Chauvin et al. | |

OTHER PUBLICATIONS

Susan A Frost et al: 11 Augmented adaptivecontrol of a wind turbine in the presence of structural modes 11, American Control Conference (ACC), 2010,IEEE, Piscataway, NJ, USA,Jun. 30, 2010 (Jun. 30, 2010), pp. 2760-2765, XP031719789,ISBN: 978-1-4244-7426-4.

Anca D Hansen et al: 11 Control of variable speed wind turbines with doubly-fed induction generators 11WIND Engineering, vol. 28, No. 4, Jul. 2, 2010 (Jul. 2, 2010), pp. 411-432, XP002559984, ISSN: 0309-524X, DOI:10.1260/0309524042886441 [retrieved on Dec. 10, 2009] pp. 425-427, section 6.2.2.

Wei Qiao et al: 11 Wind Speed Estimation Based Sensorless Output Maximization Control for a Wind Turbine Driving a DFIG 11 IEEE Transactions on Power Electronics, Institute of Electrical and Electronics Engineers, USA, vol. 23, No. 3, May 1, 2008 (May 1, 2008), pp. 1156-1169, XP011208154, ISSN: 0885-8993.

Danish Patent and Trademark Office First Technical Examination Report for Application No. PA 2016 70175 dated Oct. 19, 2016.

PCT Written Opinion of the International Searching Authority for Application No. PCT/DK2017/050093 dated Jun. 16, 2017.

* cited by examiner

CONTROL OF A WIND TURBINE USING REAL-TIME GAIN CALCULATION

TECHNICAL FIELD

The invention relates to a method for controlling a mechanism or an actuation system of a wind turbine, to an associated control system and also to a wind turbine equipped with such a control system.

BACKGROUND TO THE INVENTION

Modern utility-scale wind turbines are designed to operate in a wide range of wind conditions in order to maximise energy extraction from the wind. To realise this objective, wind turbines are usually equipped with blades whose pitch angle can be controlled by a blade pitch control system. Blade pitch is controlled by rotating each blade about its longitudinal axis which changes its angle of attack relative to the oncoming flow of wind.

Pitch control is the primary control mechanism above rated wind speed, where a wind turbine will tend to operate a full load strategy in which the objective is to maintain a constant power output. This may be achieved by controlling the blade pitch angle to ensure that the torque generated by the rotor does not increase beyond permissible limits, for example as determined by a power reference set point.

Blade pitch control may be applied collectively and individually. For example a collective component is a pitch adjustment in which the pitch angles of all of the blades are changed simultaneously, and is the main control action for adjusting the torque produced by the rotor. In contrast, an individual pitch component may adjust the pitch of selected ones of the blades independently of one another and may be used to balance loads exerted on the rotor shaft.

The configuration of the pitch control system, in particular the loop gains of the various controllers implemented in the control system, is determined largely by the operating envelope of the wind turbine. Typically, modelling is carried out during the design phase to determine the gains that are required to ensure that the pitch control system is able to achieve its desired control objectives across substantially the entire predicted operating envelope of the wind turbine. However, this approach has limitations in that the loop gains are only simulated for selected points of the operating envelope of the wind turbine. This may reduce the ability of the system to control the rotor loads during more unusual or extreme operating conditions.

It is against this background that the embodiments of the invention have been devised.

SUMMARY OF THE INVENTION

According to a first aspect of the invention there is provided a wind turbine control system comprising at least one control module configured to output a control signal for a control mechanism of a wind turbine, and a gain calculator for calculating a gain parameter associated with the control module, wherein the gain parameter is calculated based on a computerised real-time blade model using a determined wind turbine operating point as an input. The blade model may be a blade element momentum model.

In another aspect, the invention may be expressed as a method of controlling a control mechanism of a wind turbine, the method comprising determining at least one gain parameter, wherein the gain parameter is based on an output from a computerised real-time blade model using at least a measured wind turbine operating point as an input; and determining a control signal for the control mechanism based on the determined at least one gain parameter.

The invention may also be considered to reside in: a wind turbine incorporating a control system as defined above; a controller comprising a processor, a memory module, and an input/output system, and wherein the memory includes a set of program code instructions which when executed by the processor, implement a method as defined above; and a computer program product downloadable from a communication network and/or stored on a machine readable medium, comprising program code instructions for implementing a method as defined above.

In one implementation the gain parameter is part of a feedback control module, and the gain parameter is a control term of a control law implemented in the feedback control module. Although a single gain parameter may be calculated, the invention is also applicable to an implementation which includes a plurality of gain modules associated with one or more control modules.

Advantageously, the invention provides a more flexible and responsive control system that is able to adapt to changing wind conditions even if those wind conditions are beyond what is usually predicted. Since the controller gain parameters are calculated in real-time, and are based on a modelled blade characteristics, the way in which the blades respond to changes in control variables (for example blade pitch angle) can be tuned to take into account the severity of the wind conditions.

The or each of the gain parameters may be based on a respective aerodynamic sensitivity value calculated by the computerised real-time blade model, wherein that sensitivity value is indicative of the sensitivity of a force response to a change in a control variable. In such an implementation, the sensitivity value is one of the group of:

a pitch to thrust sensitivity which provides an indication of the sensitivity of thrust force along a rotor axis generated by the blades in dependence on a change in blade pitch angle;
  a pitch to torque sensitivity which provides an indication of the sensitivity of rotor torque in dependence on a change in blade pitch angle;
  a pitch to flap load sensitivity which provides an indication of the sensitivity of a blade flap loading in response to a change in the pitch angle; and
  a pitch to chord-wise bending moment sensitivity which provides an indication of the sensitivity of the chord-wise bending moment in response to a change in the pitch angle.

In the above-defined embodiments, the computerised real-time blade model may receive an estimated wind speed value as an input. The estimated rotor-plane wind speed value may be the wind speed of the planar swept area of the rotating blades of the wind turbine. The estimated wind speed value may be calculated in dependence on a difference between an actual generated power value and an estimated generated power value. Furthermore, the estimated generated power value may be obtained from the computerised real-time blade model.

In general wind turbine control, the desired operating point of the wind turbine is selected based on the wind field experienced by the rotor of the wind turbine. The operating point being defined as a point in a multidimensional parameter space spanned by two or more of the parameters generator speed, pitch angle, electrical power, electrical torque, wind speed, as well as further parameters used for controlling the wind turbine. In an embodiment, the operating point of the wind turbines is selected based on the estimated/experienced wind field of the rotor.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

In order for the invention to be more fully understood, it will now be described by way of example only with reference to the following drawings, in which.

DETAILED DESCRIPTION OF EMBODIMENTS OF THE INVENTION

Figure 1:
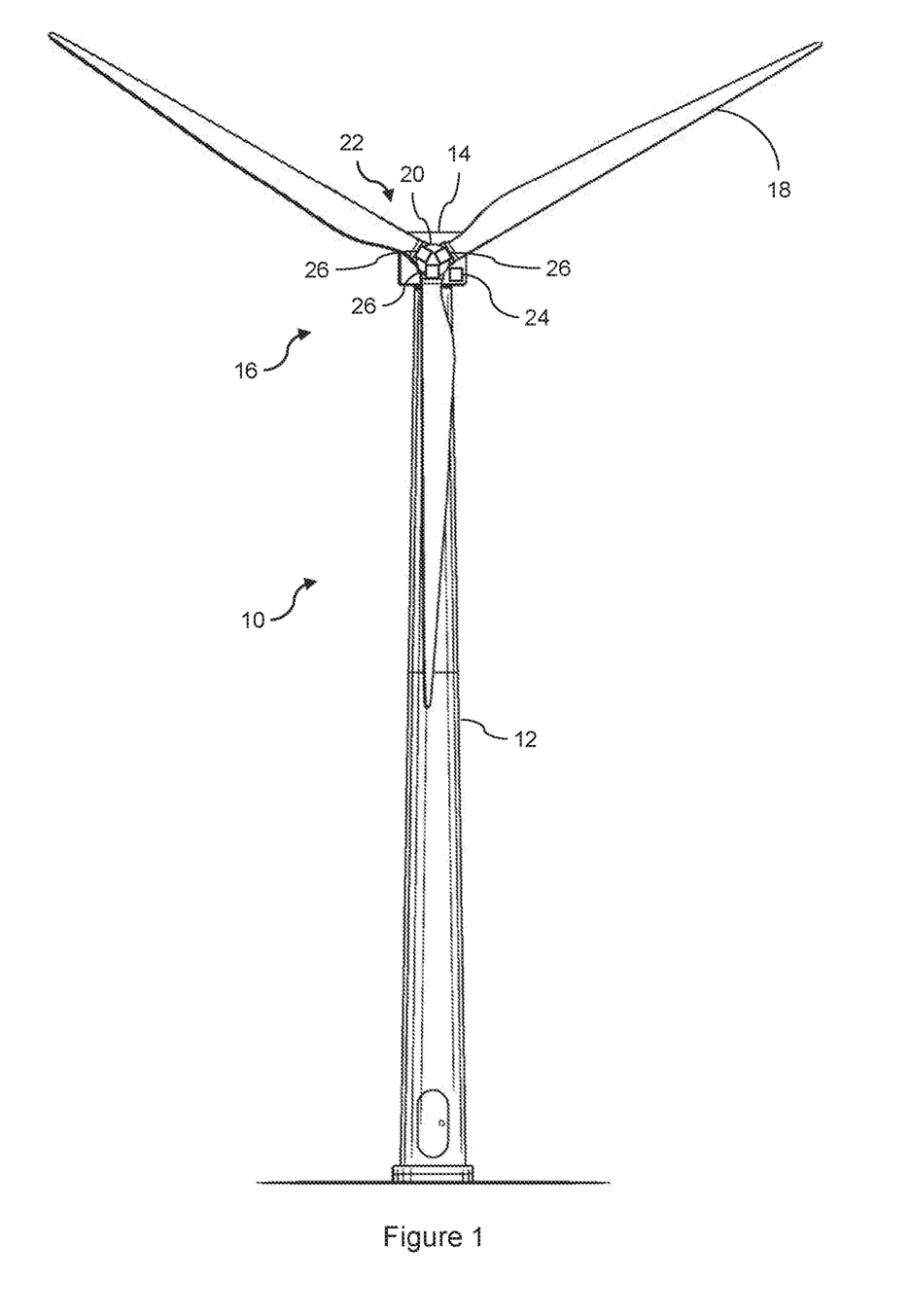
FIG. 1 is view of a wind turbine having a pitch control system.

With reference initially to FIG. 1, a wind turbine 10 comprises a tower 12 that supports a nacelle 14 to which a rotor 16 is mounted. The rotor 16 comprises a set of blades 18 that are coupled to a hub 20. The wind turbine 10 in this example is a horizontal-axis wind turbine (HAWT) that includes three blades. However, the skilled person will be aware of alternative configurations.

As is common in wind turbine designs which are configured for variable speed operation, the wind turbine 10 is equipped with a pitch control system 22 through which the blades 18 are able to be controlled so that they are angularly adjustable about their longitudinal axis. This may be achieved by way of a pitch controller 24 that is operable to command a set of pitch actuators 26 into respective pitch positions.

Figure 2:
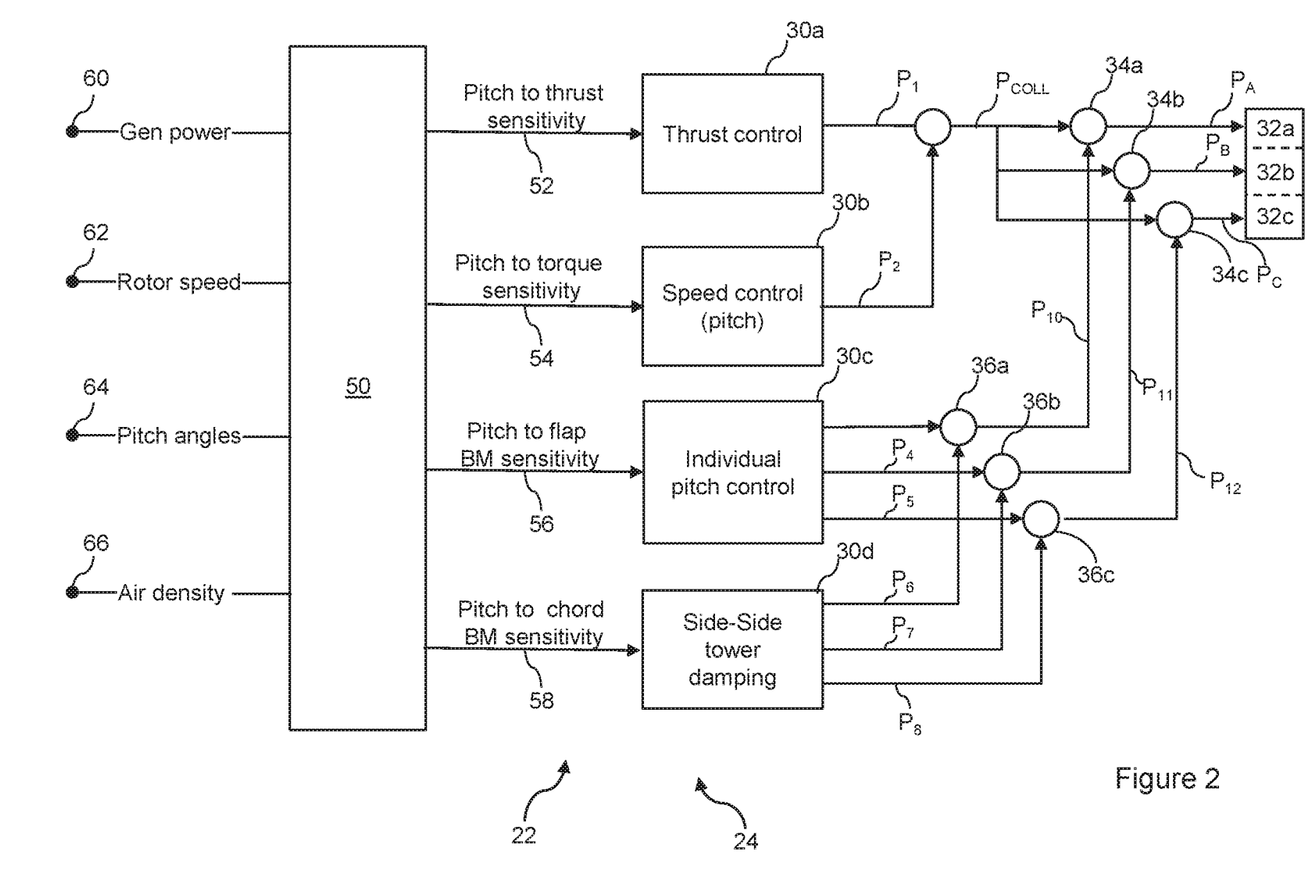
FIG. 2 is functional block diagram which shows the pitch control system of the wind turbine in more detail.

An implementation of the blade pitch control system 22 is illustrated in more detail in FIG. 2 In overview the blade pitch controller 24 includes a plurality of pitch control modules 30a-d that are operable, collectively, to provide three pitch control signals to respective pitch actuators 32a-c. More specifically, the pitch of a first blade is set by a first pitch actuator 32a in response to a first pitch control signal $P_A$, the pitch of a second blade is set by a second pitch actuator 32b in response to a second pitch control signal $P_B$, and the pitch of a third blade is set by a third pitch control actuator 30c in response to a third pitch control signal $P_C$.

The three pitch actuators 32a-c are shown here as a single unit but it would be appreciated that in practice the pitch actuators would be specific to each one of the blades 18.

In this embodiment, each of the pitch control modules 30a-d implements a suitable control law which is configured to control a process variable (e.g. a measured pitch position) so that it meets a reference or control variable (e.g. a target pitch position). Such a control law may be a PID-based control law, but may be a simplified control law if the circumstances allow.

In FIG. 2, the pitch controller is illustrated as separate entity, in general however the functionality of the pitch controller may be implemented as a functional element of a general or main controller of the wind turbine.

The four pitch control modules 30a-d work together to provide composite pitch signal inputs that are combined to form the individual pitch control signals $P_A$-$P_C$. Thus, each of the control modules 30a-30d provide a respective pitch signal that is a component part of the final pitch signals $P_A$-$P_C$ for each of the blades.

In overview, the four pitch control modules 30a-30d are: thrust control module 30a, speed control module 30b, individual pitch control (IPC) module 30c, and side-to-side tower damping (SSTD) control module 30d.

The thrust control module 30a is responsible for regulating the axial thrust generated on the rotor. The thrust force tends to tilt the nacelle and therefore applies bending moments on the tower of the wind turbine, which is desirable to control within an acceptable limit.

The speed control module 30b is responsible for controlling the torque generated by the rotor to be equal to a demanded or reference torque value. This reference value may be set by a higher level speed/power controller of the wind turbine.

The IPC control module 30c is responsible for controlling the individual pitch of the blades in order to meet predetermined flap load limits for each of the blades. Such control signal components may be cyclic in nature so as to control the flap loads within acceptable limits as the loads on each of the blades vary as the rotor rotates, for example in response to wind gusts at different heights in the rotor disc.

The SSTD control module 30d is responsible for providing damping to the lateral motion of the nacelle, that is to say transverse to the rotor axis. It does this by providing cyclic pitch adjustments in respect of each blade so as to regulate the horizontal force acting on the rotor and, thus, the supporting structure of the wind turbine.

The output signals of the thrust control module 30a and the speed control module 30b, labelled here as P1 and P2, respectively are combined into a single collective pitch control signal $P_{COLL}$. That signal is then split into three components and input into respective summing junctions 34a-c. The collective blade pitch signals $P_{COLL}$ are then combined with individual blade pitch control signals that are output by the IPC control module 30c and the SSTD control module 30d, as will be described.

The IPC control module 30c and SSTD control module 30d each output three pitch control signals, shown here as P3-P5 and P6-P8, respectively. Since the IPC control module 30c and the SSTD control module 30d output control signals that are specific to one of each of the blades, pairs of the control signals are combined at respective summing junctions 36a-c. More specifically, control signals P3 and P6 are combined at summing junction 36a to result in control signal P10 which is associated with pitch control actuator 32a; control signals P4 and P7 are combined at summing junction 36b to result in control signal P11 and is associated with pitch actuator 32b; and control signals P5 and P8 are combined at summing junction 36c to result in control signal P12 and is associated with pitch actuator 32c.

Finally, the blade-specific pitch control signals P10-P12 are combined with the collective pitch signals $P_{COLL}$ at the summing junctions 34a-c and are output as blade pitch signals $P_A$, $P_B$ and $P_C$, respectively.

It should be appreciated at this point that although four pitch control modules are provided here, an alternative and somewhat simplified system may include fewer control modules. For example if sufficient pitch control could be achieved by controlling the speed of the wind turbine, only one of the control modules may be necessary. Realistically, however, pitch control methodologies typically feature a collective pitch control element and an individual pitch control element, particularly in commercial scale wind turbine systems.

Each of the control modules 30a-30d may include at least one controller gain value. In known control approaches, the controller gain values would be optimised before or during installation of the wind turbine. Alternatively, it is known to change controller gain values based on a preset schedule in dependence on the operating condition (wind speed, generator power, rotor speed) under which the wind turbine is operating. Such gain schedules are determined in an offline environment and are configured to update the gain values of the one or more control modules once predetermined operating points of the wind turbine are reached.

In the illustrated embodiment of the invention, the controller gain values are variable in dependence on a computerised online or 'real time' blade element momentum (BEM) model 50. The BEM model is run in real time and outputs various aerodynamic sensitivity parameters to the blade control modules 30a-d. In turn, the blade control modules 30a-d are operable to compute updated gain values that are implemented in the control law therein.

In overview, the BEM model 50 is implemented as an algorithm that receives operational data inputs from suitable sources, as will be described, and which is operable to output:
- a pitch to thrust sensitivity signal 52 which provides an indication of the sensitivity of the thrust (along the rotor axis) generated by the blades in dependence on a change in pitch angle;
- a pitch to torque sensitivity signal 54 which provides an indication of the sensitivity of rotor torque in dependence on a change in pitch angle;
- a pitch to flap load bending moment sensitivity signal 56 which provides an indication of the sensitivity of blade flap loading in response to a change in the pitch angle;
- a pitch to chord-wise bending moment sensitivity signal 58 which provides an indication of the sensitivity of the chord-wise bending moment in response to a change in the pitch angle.

In order to derive the abovementioned aerodynamic sensitivity signals 52-58, the BEM model 50 receives the following inputs: a generator power signal 60, a rotor speed signal 62, measured blade pitch angle signals 64; and an air density signal 66. These signals may be obtained from appropriate sensing systems associated with the wind turbine, and either transmitted directly to the controller or sourced from a system data bus, for example.

Figure 3:
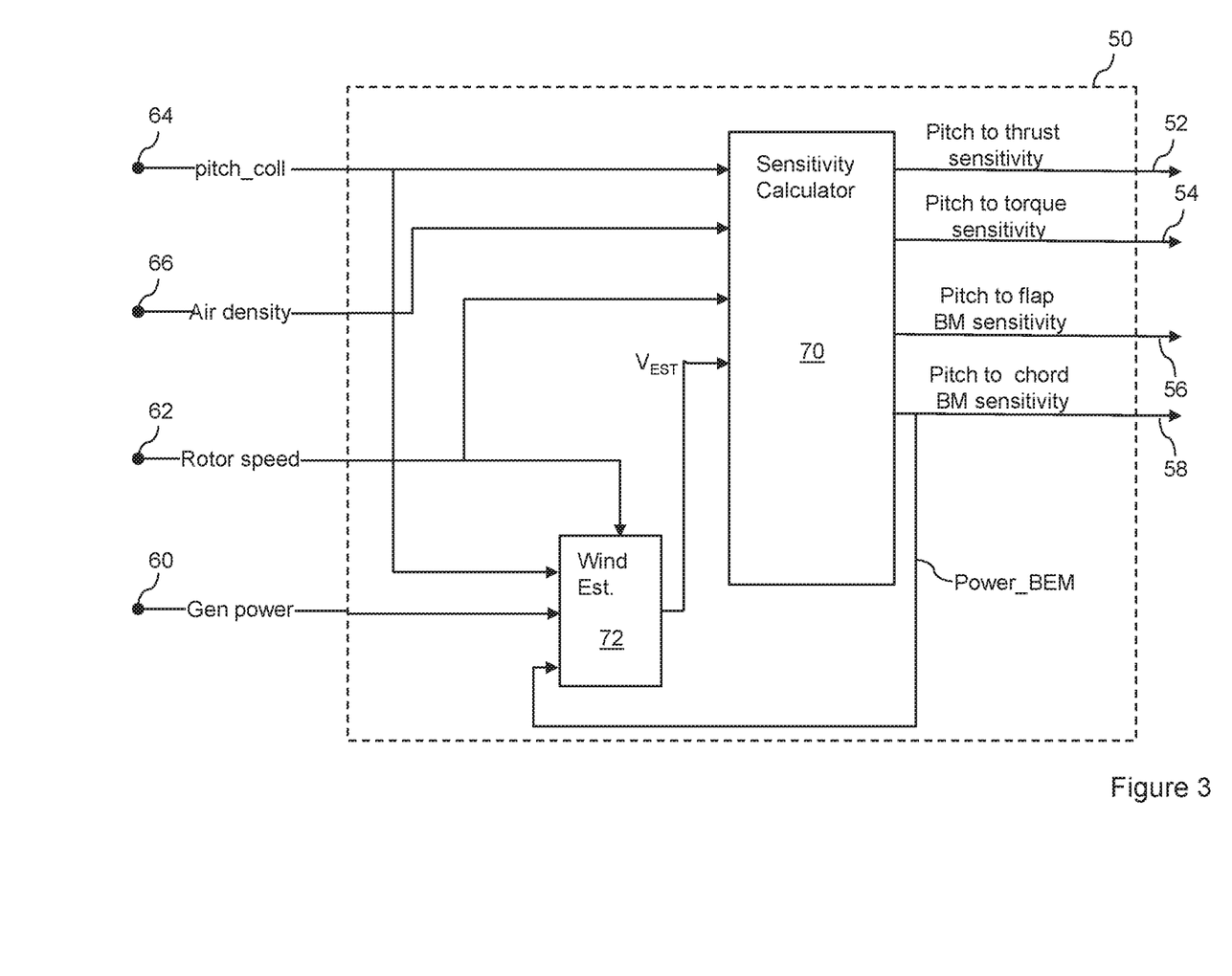
FIG. 3 is a functional block diagram which shows a part of the pitch control system in FIG. 2 in more detail.

Reference will now also be made to FIG. 3 which illustrates a possible structural implementation of the BEM model 50.

The BEM module 50 includes an aerodynamic sensitivity calculator module 70 which implements a blade element momentum model, and also a wind estimation module 72. As would be known to the skilled person a BEM model is an amalgamation of blade element theory and momentum theory that are used to analyse the performance of a wind turbine rotor. A full description will not be provided here because the theories would be well understood by engineers working in the field of wind turbine blade design and, moreover, are documented in contemporary textbooks, for example Aerodynamics of Wind Turbines, by M Hansen: ISBN no. 978-1-84407-438-9, and Wind Energy Handbook, by T Burton: ISBN no. 978-0-470-69975-1.

The aerodynamic sensitivity calculator module 70 implements blade load calculations based on lift and drag coefficients for the blades 18, which would be predetermined values based on the design of the blades 18. The calculations are based on the operating point of the wind turbine, which may be defined by the rotor speed signal 62, the measured blade pitch angle signals 64; and the air density signal 66. In addition to these signals, the aerodynamic sensitivity calculation module 70 also receives a signal indicative of the estimated wind speed through the rotor area which is determined by the wind speed estimation module 72.

The wind speed estimation module 72 provides a value of the estimated wind speed at or in the very near vicinity of the rotor plane defined by the blades 18 of the wind turbine. This value is not measurable by a standard wind speed sensor that would ordinarily be mounted to the nacelle of the wind turbine. It is important to note however that 'free wind speed', as is measured by conventional wind speed measurement and estimation techniques such as anemometers and LIDAR sensors (Light Direction and Ranging), is not an appropriate parameter to be used in the online blade model calculations discussed here. The following discussion will make this clear.

To be able to compute the forces generated along a blade, it is necessary to know the relative wind speed (Vrel) and the angle of attack of the blade. As would be understood by the skilled person, the relative wind speed is dependent on two main parameters: the wind speed at the rotor plane (Va) and the wind speed induced by the rotation of the rotor (Vrot). Momentum theory, as is understood by those skilled in the art, states that the free wind speed (Vo) and the rotor plane wind speed (Va) are related through the axial induction (a) of the rotor. The axial induction is dependent on the rotor plane wind speed (Va), the pitch angle of the blades and the rotor speed. More specifically, the expression may be considered to be Va=(1−a)Vo. Computation of the rotor plane wind speed based on the above theory is computationally intensive and is unsuited to real time implementation in a critical machine control environment.

In this embodiment, however, the wind speed estimation module 72 calculates the estimated rotor plane wind speed ($V_{EST}$) based on a comparison of the predicted aerodynamic power ($P_{BEM}$), which parameter it receives as an input from the aerodynamic sensitivity calculation module 70, and the actual generated power ($P_{GEN}$) which it receives as a direct input. So, the need for carrying out computationally intensive real time calculations is avoided, whilst still achieving an accurate estimation of the wind speed at the plane of the rotor, that is to say the speed of the wind as it passes through the planar swept area defined by the blades of the rotor as they rotate.

Figure 5:
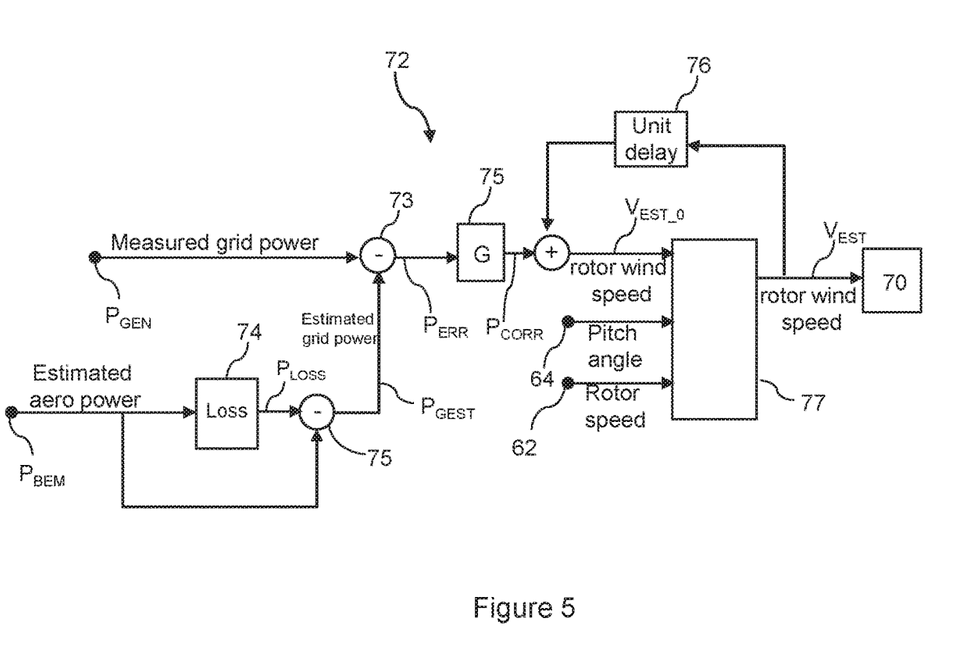
FIG. 5 is a functional block diagram of a wind estimator, as shown in FIG. 3.

One implementation of the wind speed estimation module 72 is shown in FIG. 5. In this implementation, the estimated value of the wind speed at the rotor disc is calculated based on the difference between the actual generated power of the wind turbine generated and the estimated generated power, as estimated by the blade load calculator module.

One implementation of the wind speed estimation module 72 is shown in FIG. 5. In this implementation, the estimated value of the wind speed at the rotor disc is calculated based on the difference between the actual generated power of the wind turbine and the estimated generated aerodynamic power, as estimated by the aerodynamic sensitivity calculation module 70. As will be appreciated from the following discussion, this approach to calculating the rotor wind speed is less computational intensive than an estimation approach based solely on momentum theory involving real-time iterative calculations of the axial induction factor of the rotor.

In FIG. 5, a power error signal $P_{ERR}$ is determined at a summing junction 73 by subtracting an estimated grid power signal $P_{GEST}$ from the measured grid power signal $P_{GEN}$. The signal $P_{GEST}$ is not a direct input, however, but is calculated based on the aerodynamic power signal $P_{BEM}$, as is provided by the aerodynamic sensitivity calculation module 70. More specifically, the aerodynamic power signal $P_{BEM}$ is fed into a loss calculator 74 which calculates the mechanical losses associated with the wind turbine drive train and the electrical losses associated with the wind turbine converter equipment thereby to provide a power loss signal $P_{LOSS}$. The power loss signal $P_{LOSS}$ is then subtracted from aerodynamic power signal $P_{BEM}$ at summing junction 75 to result in the estimated grid power signal $P_{GEST}$.

Based on the power error signal $P_{ERR}$, a correction signal $P_{CORR}$ is determined by passing the power error signal $P_{ERR}$ through a gain module 75. The correction signal $P_{CORR}$ is added to the rotor plane wind estimate signal $V_{EST}$ from the previous sample (fed through a unit delay 76) and the resulting signal $V_{EST\_0}$ is supplied to a stability limiting module 77. The function of the stability limiting module 77 is, in effect, to validate the corrections that are being made to the incoming $V_{EST\_0}$ signal. To do this the stability limiting module 77 also receives as inputs a pitch angle signal 64 and a rotor speed signal 62. Using these two signals, the stability limiting module 77 determines valid upper and lower limits of rotor wind speed and ensures that the incoming rotor wind speed signal $V_{EST\_0}$ is within those limits. The stability limiting module 77 may implement this functionality in various ways which would be understood by the skilled person. As an example, one implementation may be based on a look up table which correlates acceptable upper and lower rotor speed values to specific operating points based on pitch angle and rotor speed.

From the above discussion, it should be appreciated that the wind estimation module 72 does not require computationally heavy calculations based on blade models, but instead bases the estimated rotor wind speed on the convergence between measured power that is delivered by the wind turbine and the estimated power that is determined by the blade model implemented in the aerodynamic sensitivity calculation module 70.

Returning to FIG. 3, the input signals 62, 64, 66 and $V_{EST}$ received by the aerodynamic sensitivity calculation module 70 provide it with information relating to the current operating point of the wind turbine; that is current blade pitch, rotor wind speed, rotor speed and air density. Based on this definition of the current operating point, the aerodynamic sensitivity calculator module 70 is able to calculate various aerodynamic sensitivities.

For example, the sensitivity of rotor thrust to pitch angle changes can be determined by (e.g. a 0th order estimate):

$$\frac{\partial F}{\partial \theta} \approx 3\frac{F_y(\Delta\theta + \theta_0, V_0, \Omega_0) - F_y(\theta_0 - \Delta\theta, V_0, \Omega_0)}{2\Delta\theta} \quad (1)$$

The above derivation relates to the pitch to thrust sensitivity signal 52 as mentioned above.

A further example is the sensitivity of the blade flap load bending moment to changes in pitch angle, which can be detected by:

$$\frac{\partial M_x}{\partial \theta} \approx \frac{M_x(\Delta\theta + \theta_0, V_0, \Omega_0) - M_x(\theta_0 - \Delta\theta, V_0, \Omega_0)}{2\Delta\theta} \quad (2)$$

The above derivation relates to the pitch to flap load bending moment sensitivity signal 56 as mentioned above.

Furthermore, the following equation provides the sensitivity of rotor torque to changes in pitch angle, which relates to a pitch to torque sensitivity signal 54 as mentioned above:

$$\frac{\partial M_{rot}}{\partial \theta} \approx 3\frac{M_y(\Delta\theta + \theta_0, V_0, \Omega_0) - M_y(\theta_0 - \Delta\theta, V_0, \Omega_0)}{2\Delta\theta} \quad (3)$$

Whereas the following equation provides the sensitivity of the chord-wise or 'in plane' bending moment to changes in pitch angle, which corresponds to the pitch to chord-wise bending moment sensitivity signal 58 as mentioned above.

$$\frac{\partial F_x}{\partial \theta} \approx \frac{F_x(\Delta\theta + \theta_0, V_0, \Omega_0) - F_x(\theta_0 - \Delta\theta, V_0, \Omega_0)}{2\Delta\theta}$$

In the above equations, $\theta_0$, $V_0$, $\Omega_0$ (pitch angle, wind speed, rotor speed) is the computed operating point $\Delta V$, $\Delta\theta$ are the wind speed and pitch ranges over which the $0^{th}$ order approximation is done and $M_x$, $F_y$ are respectively the estimated Blade root in plane moment and out of plane force, respectively. In general, it will be understood that the BEM model 50 is able to determine the following sensitivity measures:

Thrust force, $F_y$, sensitivity to pitch, rotor speed and wind speed.

Driving moment, $M_y$, sensitivity to pitch, rotor speed and wind speed.

Blade bending moment, $M_x$, sensitivity to pitch, rotor speed and wind speed.

Transversal force, $F_x$, sensitivity to pitch, rotor speed and wind speed.

Based on these basic sensitivities it is possible to compute other sensitivities e.g.

Tilt and yaw moment to cyclic pitch, wind speed and rotor speed

Power and torque to collective pitch, wind speed and rotor speed

Side-side and up-down force to cyclic pitch, wind speed and rotor speed

Rotor thrust to collective pitch, wind speed and rotor speed

The aerodynamic sensitivity variables output from the BEM model 50 are input to the control modules 52-58 and thereafter used to calculate, in real time, updated gain values for use within the respective control modules 30a-d. The following example of how suitable control gains may be updated will provide a full appreciation of the implementation.

Figure 4:
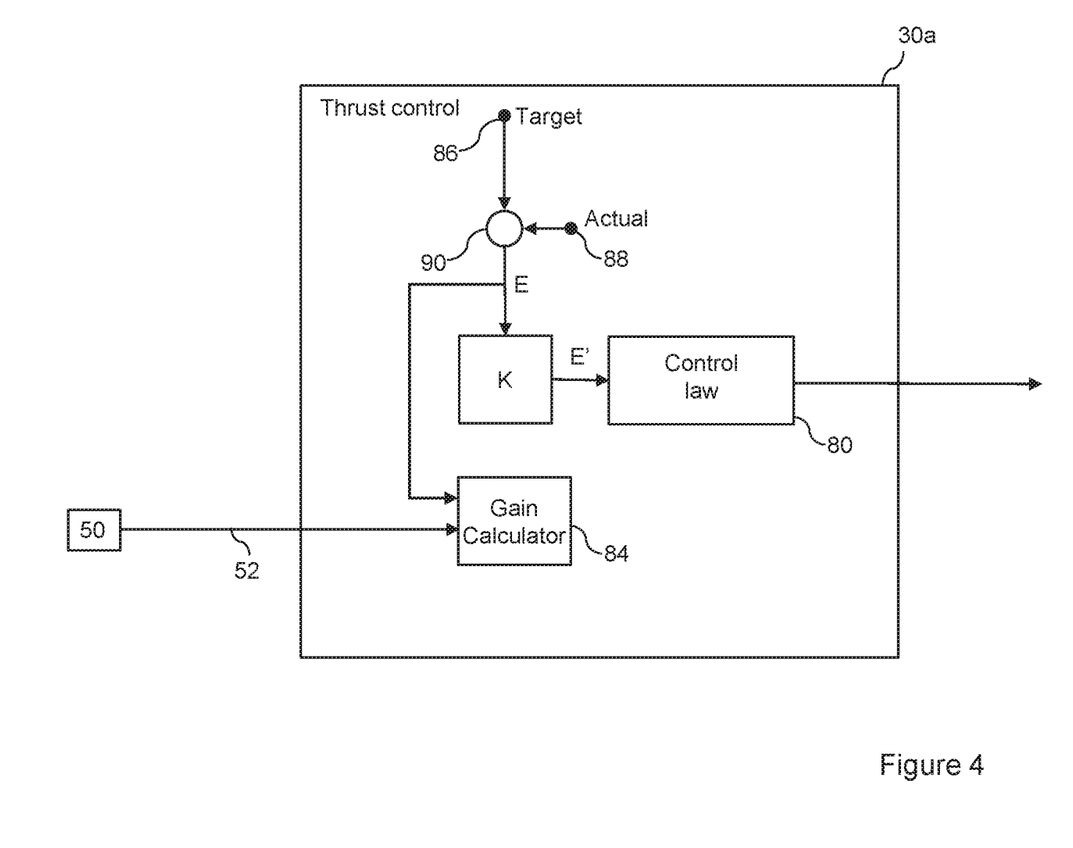
FIG. 4 is a functional block diagram which shows another part of the pitch control system in FIG. 2 in more detail.

The thrust control module 30a is shown in more detail in FIG. 4. As can be seen, the thrust control module 30a includes a control law 80, a gain block 82 and a gain calculator 84. As has been mentioned, the control law 82 may be in the form of a PID control law or a simplified version thereof, as appropriate.

The control law 80 acts on a modified error input E' and outputs a collective pitch signal $P_{COLL\_THRUST}$ in order to reduce the modified error signal to zero. The modified error signal E' is determined by the gain block 82 that acts on an initial error signal E that is derived from the difference between a target thrust value 86 and an actual or measured thrust value 88, calculated at summing point 90. Note that the target thrust value 86 may be received from a higher level controller and the measured value 88 may be received from the data bus of the wind turbine or directly from a suitable measuring or control system.

The error signal E is input into the gain block 82 which then calculates the modified error signal E'. As has been mentioned, the thrust control module 30a receives a continuously updated aerodynamic sensitivity signal from the real time BEM model 50, more specifically the pitch to thrust sensitivity signal 52. This provides the thrust control module 30a with a contemporaneous value, based on the prevailing operating point of the wind turbine 10, of the sensitivity or responsiveness of thrust changes resulting from a change in pitch. As an example, in order to calculate a suitable gain value, the gain calculator 84 may use the following formula:

$$\text{Gain} = K_{TL} \frac{\frac{\partial F_{y,nom}}{\partial \theta}}{\frac{\partial F_y}{\partial \theta}} \quad (3)$$

In the above formula:

$\frac{\partial F_y}{\partial \theta}$ is the sensitivity computed by the online BEM model 50;

$\frac{\partial F_{y,nom}}{\partial \theta}$ is a parameter denoting the "nominal" sensitivity; and $K_{TL}$ is the desired controller gain at nominal sensitivity.

It should be noted here that the nominal sensitivity may be the rotor thrust force sensitivity to changes in pitch at rated wind speed, which would be where the thrust force would be highest. At this operating point, therefore, the controller gain $K_{TL}$ can be calculated and the gain scheduling will correct for other operating points.

It will be appreciated that the same principle and the same structure as used for the thrust control module 30a as is shown in FIG. 4 can also be applied to the other control modules 30b, 30c and 30d.

For example, the side-side tower damping control module 30d may have a common structure although the gain block may be updated with a different gain value as calculated by the gain calculator 84. For instance, the gain calculator may implement the following formula to calculate the required gain in real time:

$$\text{Gain} = K_{SS} \frac{\frac{\partial F_{ss,nom}}{\partial \theta}}{\frac{3}{2} \frac{\partial F_x}{\partial \theta}}$$

In the above formula:
$K_{ss}$ is the nominal gain, $\frac{\partial F_{ss,nom}}{\partial \theta}$ is the nominal side side force sensitivity to cyclic pitch amplitude and $\frac{\partial F_x}{\partial \theta}$ is the blade in plane force sesitivity to pitching as derived from on-line BEM.

From the above discussion, it will be appreciated that the embodiments of the invention provide a control system in which selected gain terms thereof are continuously updated based at least in part on the prevailing operating point of the wind turbine, as enabled by a computerised real time blade model. This provides for more accurate regulation of the control mechanism under control, in this case a pitch control mechanism, since the gain terms of the relevant controllers are able to be adapted in response to changes in the operating point of the wind turbine. A particular advantage is that the controller performance remains high even if the operating point of the wind turbine extends beyond that which is usually expected so that the wind turbine performs well in unusual conditions such as extreme temperature operation, start up and shutdown during high wind conditions and so on.

The skilled person will appreciate that modifications could be made to the specific embodiments discussed above without departing from the inventive concept as defined by the claims.

For example, in the illustrated embodiment the gain block 82 acts on the error signal E and then passes the modified error signal to the control law 80. However, it should be noted that the control module 30a could be configured such that the gain calculator 84 updates the gain terms contained within the control law, for example any proportional, integral or derivative gain terms.

In the illustrated embodiments, the computerised blade model implemented in the system is a blade element momentum model. Other blade models having similar objectives may be used such as models based on computational fluid dynamic theories, although such models may not be so computationally efficient.

Note that in the above discussion the various control modules and functional blocks are described as separate functional units. However, this will be understood as accepted convention and that such structure should not be considered to impose any limitation on how that functionality is implemented, either in software, firmware or hardware.

The invention claimed is:

1. A wind turbine control system comprising:
   at least one control module configured to output a control signal for a control mechanism of a wind turbine, and a gain calculator for calculating a gain parameter associated with the control module,
wherein the gain calculator receives an input based on a computerized real-time blade model that uses a determined wind turbine operating point as an input, in order to calculate the gain parameter, wherein the computerized real-time blade model is configured to determine a load on a blade in response to the determined wind turbine operating point in order to provide the input to the gain calculator.

2. The wind turbine control system of claim 1, wherein the gain parameter is part of a feedback control module.

3. The wind turbine control system of claim 2, wherein the gain parameter is a control term of a control law implemented in the feedback control module.

4. The wind turbine control system of claim 2, wherein a plurality of gain parameters are determined, and wherein one or more of the plurality of gain parameters are associated with the control module.

5. The wind turbine control system of claim 4, wherein the at least one control module comprises a plurality of control modules, wherein each control module provides a component of the control signal.

6. The wind turbine control system of claim 1, the gain parameter is based on a respective aerodynamic sensitivity value calculated by the computerized real-time blade model, wherein the aerodynamic sensitivity value is indicative of the sensitivity of a force response to a change in a control variable.

7. The wind turbine control system of claim 6, wherein the aerodynamic sensitivity value is selected from a group comprising:
a pitch to thrust sensitivity which provides an indication of the sensitivity of a thrust force along a rotor axis generated by blades in dependence on a change in a blade pitch angle;
a pitch to torque sensitivity which provides an indication of the sensitivity of a rotor torque in dependence on the change in the blade pitch angle;
a pitch to flap load sensitivity which provides an indication of the sensitivity of a blade flap loading in response to the change in the blade pitch angle; and
a pitch to chord-wise bending moment sensitivity which provides an indication of the sensitivity of a chord-wise bending moment in response to the change in the blade pitch angle.

8. The wind turbine control system of claim 1, wherein the computerized real-time blade model is a blade element momentum model.

9. The wind turbine control system of claim 1, wherein the computerized real-time blade model receives an estimated wind speed value as an input.

10. The wind turbine control system of claim 9, wherein the estimated wind speed value is calculated in dependence on a difference between an actual generated power value and an estimated generated power value.

11. The wind turbine control system of claim 10, wherein the estimated generated power value is obtained from the computerized real-time blade model.

12. The wind turbine control system of claim 9, wherein the estimated wind speed value is the wind speed of the planar swept area of rotating blades.

13. The wind turbine control system of claim 1, wherein the control mechanism is a pitch control mechanism.

14. A method of controlling a control mechanism of a wind turbine, the method comprising:
determining at least one gain parameter, wherein the gain parameter is based on an output from a computerized real-time blade model using at least a measured wind turbine operating point as an input, wherein the computerized real-time blade model is configured to determine a load on a blade in response to the measured wind turbine operating point in order to provide an input to a gain calculator; and
determining a control signal for the control mechanism based on the determined at least one gain parameter.

15. A wind turbine, comprising:
a tower;
a nacelle disposed on the tower;
a rotor extending from the nacelle, and having a plurality of blades disposed thereon; and
a control system, comprising:
at least one control module configured to output a control signal for a control mechanism of the wind turbine, and
a gain calculator for calculating a gain parameter associated with the control module, wherein the gain calculator receives an input based on a computerized real-time blade model that uses a determined wind turbine operating point as an input, in order to calculate the gain parameter, wherein the computerized real-time blade model is configured to determine a load on the blade in response to the determined wind turbine operating point in order to provide the input to the gain calculator.

16. The wind turbine of claim 15, wherein the gain parameter is a control term of a control law implemented in a feedback control module.

17. The wind turbine of claim 15, wherein the gain calculator calculates a plurality of gain parameters, and wherein one or more of the plurality of gain parameters are associated with the control module.

18. The wind turbine of claim 17, wherein the at least one control module comprises a plurality of control modules, wherein each control module provides a component of the control signal.

* * * * *